(12) United States Patent
Carlson et al.

(10) Patent No.: US 8,353,344 B2
(45) Date of Patent: Jan. 15, 2013

(54) FIBER AGGREGATE

(75) Inventors: James G. Carlson, Lake Elmo, MN (US); Michael R. Berrigan, Oakdale, MN (US); Michael D. Crandall, North Oaks, MN (US); Ignatius A. Kadoma, Cottage Grove, MN (US); Yong K. Wu, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 403 days.

(21) Appl. No.: 12/747,985

(22) PCT Filed: Dec. 11, 2008

(86) PCT No.: PCT/US2008/086323
§ 371 (c)(1),
(2), (4) Date: Jun. 14, 2010

(87) PCT Pub. No.: WO2009/079315
PCT Pub. Date: Jun. 25, 2009

(65) Prior Publication Data
US 2010/0288500 A1    Nov. 18, 2010

Related U.S. Application Data

(60) Provisional application No. 61/013,819, filed on Dec. 14, 2007.

(51) Int. Cl.
*E21B 43/267* (2006.01)
*B32B 5/02* (2006.01)
*C09K 8/62* (2006.01)
*C09K 8/80* (2006.01)

(52) U.S. Cl. .................. 166/280.2; 166/308.5; 428/375; 428/395; 507/204

(58) Field of Classification Search .................. None
See application file for complete search history.

(56) References Cited

U.S. PATENT DOCUMENTS

| | | | |
|---|---|---|---|
| 4,406,850 A | 9/1983 | Hills | |
| 4,684,570 A | 8/1987 | Malaney | |
| 4,690,503 A | 9/1987 | Janssen | |
| 4,732,809 A | 3/1988 | Harris, Jr. | |
| 4,756,786 A | 7/1988 | Malaney | |

(Continued)

FOREIGN PATENT DOCUMENTS

CN    1936127    3/2007

(Continued)

OTHER PUBLICATIONS

ASTM Designation: D 1895-96. "Standard Test Methods for Apparent Density, Bulk Factor, and Pourability of Plastic Materials", 2010, pp. 1-5.

(Continued)

*Primary Examiner* — Zakiya W Bates
(74) *Attorney, Agent, or Firm* — C. Michael Geise (57) ABSTRACT

Fiber aggregate comprising organic polymeric fibers, wherein the organic polymeric fibers have an average length in a range from 2 to 20 millimeters, an average diameter up to 100 micrometer, and comprise at least 75 percent by solid volume of the fiber aggregate, wherein the fiber aggregate has an unrestrained bulk density of at least 0.05 $g/cm_3$, and wherein at least 85% by volume of the fiber aggregate disassociates to provide dispersed fibers. The fiber aggregates are useful, for example, for flowback control in wellbores and reservoirs.

18 Claims, 4 Drawing Sheets

U.S. PATENT DOCUMENTS

| | | | |
|---|---|---|---|
| 4,770,925 A | 9/1988 | Uchikawa | |
| 4,774,124 A | 9/1988 | Shimalla | |
| 5,017,268 A | 5/1991 | Clitherow | |
| 5,094,604 A | 3/1992 | Chavez | |
| 5,162,074 A | 11/1992 | Hills | |
| 5,185,204 A | 2/1993 | Shimizu | |
| 5,225,201 A | 7/1993 | Beaurline | |
| 5,302,443 A | 4/1994 | Manning | |
| 5,330,005 A | 7/1994 | Card | |
| 5,380,477 A | 1/1995 | Kent | |
| 5,411,693 A | 5/1995 | Wust, Jr. | |
| 5,456,982 A | 10/1995 | Hansen | |
| 5,458,472 A | 10/1995 | Kobayashi | |
| 5,460,884 A | 10/1995 | Kobylivker | |
| 5,501,274 A | 3/1996 | Nguyen | |
| 5,501,275 A | 3/1996 | Card | |
| 5,540,992 A | 7/1996 | Marcher | |
| 5,551,514 A | 9/1996 | Nelson | |
| 5,591,199 A | 1/1997 | Porter | |
| 5,593,768 A | 1/1997 | Gessner | |
| 5,618,479 A | 4/1997 | Lijten | |
| 5,631,085 A | 5/1997 | Gebauer | |
| 5,633,082 A | 5/1997 | Berger | |
| 5,641,584 A | 6/1997 | Andersen | |
| 5,667,864 A | 9/1997 | Landoll | |
| 5,672,419 A | 9/1997 | Mukaida | |
| 5,698,322 A | 12/1997 | Tsai | |
| 5,714,256 A | 2/1998 | DeLucia | |
| 5,733,825 A | 3/1998 | Martin | |
| 5,756,625 A | 5/1998 | Crandall | |
| 5,759,926 A | 6/1998 | Pike | |
| 5,765,256 A | 6/1998 | Allan et al. | |
| 5,776,838 A | 7/1998 | Dellinger | |
| 5,786,059 A | 7/1998 | Frank | |
| 5,798,305 A | 8/1998 | Horiuchi | |
| 5,811,186 A | 9/1998 | Martin et al. | |
| 5,871,049 A | 2/1999 | Weaver | |
| 5,891,119 A | 4/1999 | Ta | |
| 5,902,679 A | 5/1999 | Kojima | |
| 5,945,134 A | 8/1999 | Strait | |
| 5,972,463 A | 10/1999 | Martin | |
| 5,989,004 A | 11/1999 | Cook | |
| 6,059,034 A | 5/2000 | Rickards | |
| 6,156,842 A | 12/2000 | Hoenig | |
| 6,168,857 B1 * | 1/2001 | Andersen et al. | 428/292.1 |
| 6,172,011 B1 | 1/2001 | Card | |
| 6,207,276 B1 | 3/2001 | Spindler | |
| 6,258,304 B1 | 7/2001 | Bahia | |
| 6,391,443 B1 | 5/2002 | Terada | |
| 6,417,121 B1 | 7/2002 | Newkirk | |
| 6,444,600 B1 | 9/2002 | Baek | |
| 6,528,157 B1 | 3/2003 | Hussain et al. | |
| 6,689,242 B2 | 2/2004 | Bodaghi | |
| 6,732,800 B2 | 5/2004 | Acock | |
| 6,767,498 B1 | 7/2004 | Talley, Jr. | |
| 6,783,852 B2 | 8/2004 | Inada | |
| 6,875,506 B2 | 4/2005 | Husemann | |
| 7,767,298 B2 | 8/2010 | Nakatsuka | |
| 2004/0092191 A1 | 5/2004 | Bansal et al. | |
| 2005/0161411 A1 | 7/2005 | Boner | |
| 2005/0274517 A1 | 12/2005 | Blauch | |
| 2006/0032633 A1 | 2/2006 | Nguyen | |
| 2006/0035790 A1 | 2/2006 | Okell | |
| 2006/0063457 A1 | 3/2006 | Matsui | |
| 2006/0199006 A1 | 9/2006 | Poon | |
| 2007/0028808 A1 * | 2/2007 | Cook et al. | 106/644 |
| 2007/0044958 A1 | 3/2007 | Rytlewski | |
| 2008/0317984 A1 | 12/2008 | Yamashita | |
| 2009/0068463 A1 | 3/2009 | Mochizuki | |
| 2009/0142595 A1 | 6/2009 | Matsui et al. | |

FOREIGN PATENT DOCUMENTS

| | | |
|---|---|---|
| CN | 1949007 | 4/2007 |
| DE | 102005048442 | 4/2007 |
| EP | 089113 | 9/1983 |
| EP | 122827 | 10/1984 |
| EP | 138549 | 4/1985 |
| EP | 140415 | 5/1985 |
| EP | 159635 | 10/1985 |
| EP | 165817 | 12/1985 |
| EP | 171806 | 2/1986 |
| EP | 248598 | 12/1987 |
| EP | 260607 | 3/1988 |
| EP | 518690 | 12/1992 |
| EP | 538047 | 4/1993 |
| EP | 704001 | 12/1994 |
| EP | 906824 | 4/1999 |
| EP | 906972 | 4/1999 |
| EP | 929701 | 7/1999 |
| EP | 955404 | 11/1999 |
| EP | 963468 | 12/1999 |
| EP | 963472 | 12/1999 |
| EP | 991799 | 4/2000 |
| EP | 1290255 | 3/2003 |
| EP | 1300511 | 4/2003 |
| EP | 1326003 | 7/2003 |
| EP | 1373607 | 1/2004 |
| EP | 1466044 | 10/2004 |
| EP | 1476598 | 11/2004 |
| EP | 1577426 A1 | 9/2005 |
| EP | 1 589 137 | 10/2005 |
| GB | 2319265 | 5/1998 |
| GB | 2337227 | 11/1999 |
| IE | 057094 | 4/1992 |
| JP | 4648725 | 9/2006 |
| JP | 2007084946 | 4/2007 |
| JP | 2007084954 | 4/2007 |
| JP | 2007084958 | 4/2007 |
| JP | 2007090913 | 4/2007 |
| JP | 2007091260 | 4/2007 |
| JP | 2007092229 | 4/2007 |
| JP | 2007092236 | 4/2007 |
| JP | 2007092266 | 4/2007 |
| JP | 2007105184 | 4/2007 |
| JP | 2007105185 | 4/2007 |
| JP | 2007107123 | 4/2007 |
| JP | 2007107126 | 4/2007 |
| JP | 2007107143 | 4/2007 |
| JP | 2007107144 | 4/2007 |
| JP | 2007113143 | 5/2007 |
| JP | 2007113153 | 5/2007 |
| JP | 2007113158 | 5/2007 |
| JP | 2007119975 | 5/2007 |
| JP | 2007119976 | 5/2007 |
| JP | 2007119977 | 5/2007 |
| RU | 2257465 | 4/2005 |
| WO | WO 9429506 | 12/1994 |
| WO | WO 9634134 | 10/1996 |
| WO | WO 9637644 | 11/1996 |
| WO | WO 9814647 | 4/1998 |
| WO | WO 9826118 | 6/1998 |
| WO | WO 9927229 | 6/1999 |
| WO | WO 0129295 | 4/2001 |
| WO | WO 0190464 | 11/2001 |
| WO | WO 0244447 | 6/2002 |
| WO | WO 03069039 | 8/2003 |
| WO | WO 2007046052 | 4/2007 |
| WO | WO 2007046296 | 4/2007 |
| WO | WO 2007047844 | 4/2007 |
| WO | WO 2007049522 | 5/2007 |

OTHER PUBLICATIONS

ASTM Designation: D 3418-03, "Standard Test Method for Transition Temperatures of Polymers by Differential Scanning Calorimetry", 2004, pp. 1-7.

European Chemical News, vol. 54, No. 1426, p. 35, (Jun. 11, 1990).

"Factors Influencing the Release Profile from a Multiparticulate Delivery System", Amherst, NY, [online], [retrieved from the internet on May 13, 2011], Published on Mar. 27, 2003, IP.com No. 000011953D, <www.ip.com>, 3 pages.

"Factors Influencing the Physical Characteristics of Tablets", [online], [retrieved from the internet on May 13, 2011], Published on Aug. 12, 2003, IP.com No. 000018809D, <www.ip.com>, 2 pages.

Fibres, High Performance Textiles, p. 1-2, (Aug. 1993).

"Flame Retardants: The Bromine Controversy", Plastics Compounding, vol. 16, No. 5, pp. 29-40, (Sep./Oct. 1993).

Garg, "Biconstituent Fibres of Nylon 6-Poly(ethylene terephthalate)" Die Angewandte Makromolekulare Chemie, vol. 90, No. 1319, pp. 57-68, (1980).

Hong, Jet-Assisted Aerosol CVD for Multicomponent Particle Deposition, Chemical Vapor Deposition, vol. 12, pp. 627-630, (2006).

"Multi-Polymer Formulation", Amherst, NY, [online], [retrieved from the internet on May 13, 2011], Published on Jun. 28, 2004, IP.com No. 000029440D, <www.ip.com>, 2 pages.

Sevčenko, "Electrical Properties of Polymer Composite Structures Comprising Conductive Fibers", Plastics and Rubber with Section Coating Materials, vol. 32, No. 11, pp. 401-407, 1985.

Strauch, "Multi-component Injection Molding", Plastic Processor, vol. 36, No. 5, pp. 57-62, 1985.

"Sustained Release Formulations with Ciprofloxacin", Amherst, NY, [online], [retrieved from the internet on May 13, 2011], Published on Dec. 22, 2006, IP.com No. 00144216D, <www.ip.com>, 2 pages.

"Sustained Release Formulations with Gliclazide", Amherst, NY, [online], [retrieved from the internet on May 13, 2011], Published on Nov. 29, 2005, IP.com No. 000132029D, <www.ip.com>, 2 pages.

"Trützschler: To Listen to the Market Leads to Success", International Textile Bulletin, Feb. 2001, pp. 28-34.

International Search Report for Int'l Appln. No. PCT/US2008/086313, 4 pages, 2009.

Written Opinion of the ISA for Int'l Appln. No. PCT/US2008/086313, 4 pages, 2009.

International Search Report for Int'l Appln. No. PCT/US2008/086323, 4 pages, 2009.

Written Opinion of the ISA for Int'l Appln. No. PCT/US2008/086323, 4 pages, 2009.

Brostow et al., "Brittleness of materials: implications for composites and a relation to impact strength," *Journal of Materials Science*, vol. 45, No. 1, pp. 242-250, (Oct. 8, 2009).

Villenueva et al., "Comparative Study of Nanocomposites of Polyolefin Compatibilizers Containing Kaolinite and Montmorillonite Organoclays,", *Journal of Applied Polymer Science*, vol. 115, No. 3, pp. 1325-1335 (Oct. 7, 2009).

* cited by examiner

FIBER AGGREGATE

CROSS REFERENCE TO RELATED APPLICATIONS

This application is a national stage filing under 35 U.S.C. 371 of PCT/US2008/086323, filed Dec. 11, 2008, which claims priority to U.S. Provisional Application No. 61/013,819, filed Dec. 14, 2007, the disclosure of which is incorporated by reference in its/their entirety herein.

BACKGROUND

Various fiber aggregates are known, including those for use in applications such as concrete composites, filtration, and absorption.

In another aspect, various multi-component fibers are known. Useful properties of some of these fibers include fiber bonding, wherein for example, a low melting or softening sheath covers a higher melting core. The sheath, when melted or softened serves as a bonding agent for the core.

In another aspect, oil and gas field operators have a need for controlling proppant flowback. Several different approaches have been used to solve this problem, including the use of resin coated (e.g., the coating may be thermosetting resins, such as epoxies and phenolics, and thermoplastic elastomers, such as acrylic resins) proppants. The coated proppants are expected to adhere to each other at the down hole to form an integrated proppant block in down hole. A disadvantage of resin coated proppants for proppant flowback control is the potential premature curing of the proppants, as well as compatibility with the components of hydraulic fracture fluid, such as breakers.

Relatively short fibers (see, e.g., U.S. Pat. No. 5,330,005 (Card et al.), U.S. Pat. No. 5,501,275 (Card et al.), and U.S. Pat. No. 6,172,011 (Card et al.)) have been applied to flowback control. A disadvantage of this approach is its efficiency in controlling flowback. Other approaches have been proposed, such as inclusion of short fibers in the resin coated layers on the proppant, and the modification of proppant geometry including the aspect ratio and particle size distribution.

There is a need for additional flowback control options.

SUMMARY

In one aspect, the present disclosure describes a fiber aggregate(s) comprising organic polymeric fibers, wherein at least 50 (in some embodiments, at least 55, 60, 65, 70, 75, 80, 805, 90, 95, 96, 97, 98, 99, or even 100) percent by volume of fibers present in the aggregate are the organic polymeric fibers, wherein the organic polymeric fibers have an average length in a range from 2 to 20 millimeters (in some embodiments, in a range from 2 to 10 millimeters), wherein the organic polymeric fibers have an average diameter up to 100 micrometers (in some embodiments, up to 95, 90, 85, 80, 75, 70, 65, 60, 55, 50, 45, 40, 35, 30, 25, 20, 15, or even up to 10 micrometers), and comprises at least 75 (in some embodiments, at least 80, 85, 90, 95, 97, 98, 99, or even 100) percent by solid volume of the aggregate, wherein up to at least 80% (in some embodiments, up to at least 85%, or even at least 90%) by number of the organic polymeric fibers have an acute included angle between the fibers at fiber intersections (i.e., points of fiber to fiber contact) not greater than 20° (in some embodiments, not greater than 15°, or even less than) 10°, wherein the aggregate has an unrestrained bulk density of at least 0.05 $g/cm^3$ (in some embodiments, in a range from 0.2 $g/cm^3$ to less than 1.2 $g/cm^3$, or even from 0.2 $g/cm^3$ to 1 $g/cm^3$), and wherein at least 85% (in some embodiments, at least 90, 95, 97, 98, 99, or even 100) by solid volume of the aggregate disassociates to provide dispersed fibers according to The Aggregate Disassociation Test. The term "solid volume" refers to the volume of the aggregate less any porosity (both open and closed porosity). In some embodiments, the fiber aggregate(s) comprise binder to facilitate holding the fibers together, while in other embodiments, the fiber aggregate(s) is free of binder.

Fiber aggregates described herein are useful, for example, for flowback control applications in wellbores and reservoirs. The fiber aggregates are also useful for facilitating the maintenance of proppant distribution during injection and placement in wellbores, as well as aiding in providing a more uniform proppant distribution in the fracture(s).

Advantages of fiber aggregates described herein for these applications can include a relatively convenient way to add the fibers to wellbores and reservoirs that reduce or eliminates fiber clumping, as well as facilitates or otherwise aids in the desired dispersion of the fibers into fluid. Use of fiber aggregates described herein can also provide a more precise way to measure and deliver the fibers to the desired location given the relatively more handleable form of the fibers in the aggregates versus loose fibers.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION

At least 50 (in some embodiments, at least 55, 60, 65, 70, 75, 80, 805, 90, 95, 96, 97, 98, 99, or even 100) percent by volume of fibers present in the aggregates described herein are the organic polymeric fibers. Exemplary organic polymeric fibers for making aggregates described herein include fibers comprised of thermoplastic polymers, thermoset polymers, and combinations thereof. In some embodiments, the fibers are comprised of at least one of a thermoplastic or thermoset polymer. In some embodiments, the fibers are multi-component fibers and/or blends of different fibers compositions (i.e., fibers having two or more regions of phase and/or chemical compositions; in other words, two or more regions that are distinct either physically, chemically, or both physically and chemically (e.g., regions having different glass transition temperatures, $T_g$). As one of many examples, in the case of multi-component fibers, the material in the inner core of a core-sheath fiber may be selected for strength, flexibility and robustness, while the outer layer may be selected for its adhesive qualities. As another example, a side-by-side bicomponent fiber may have one component selected for strength, flexibility and robustness, while the other component may be selected for its adhesive qualities. Other suitable multi-component articles include those wherein the least robust material is enclosed in a more robust sheath; those wherein polymers such as polylactic acid and polyglycolic acid are enclosed in a sheath comprised of polyester, polyamide, and/or polyolefin thermoplastic; those wherein a sensitive adhesive, for example, a pressure-sensitive adhesive, temperature-sensitive adhesive, or moisture-sensitive adhesive, or curable adhesive is enclosed in a degradable sheath, such as a polymer sheath; and those wherein one of the components is selected to be tacky at a specific downhole temperature, such as the bottomhole static temperature (BHST), and have a modulus of less than $3 \times 10^6$ dynes/cm$^2$ at a frequency of about 1 Hz.

Other fibers that may be present include glass, ceramics, metals, natural fibers, and combinations thereof.

Suitable fibers can be made by techniques known in the art and/or obtained commercially. For example, multi-component fibers can generally be made using techniques known in the art such as multi-component (e.g., bi-component) fiber spinning (see, e.g., U.S. Pat. No. 4,406,850 (Hills), U.S. Pat. No. 5,458,472 (Hagen), U.S. Pat. No. 5,411,693 (Wust), U.S. Pat. No. 5,618,479 (Lijten), and U.S. Pat. No. 5,989,004 (Cook)).

Suitable polymeric materials for making multi-component fibers are known in the art. Desirable multi-component fibers comprise at least two polymers, one having a softening point up to 150° C. and the other having a melting point of at least 130° C.

For the core-sheath configurations it is within the scope of the present disclosure to have multiple sheaths. Each component of the fiber, including additional polymers, can be selected to provide a desirable performance characteristic(s). For example, if the sheath polymer is flows a too low a temperature it can be increased by adding a second polymer with a higher flow temperature. Various configurations have certain advantages depending on the application intended. Further, for example, the core-sheath and the islands configuration (see, e.g., FIGS. 1B and 1C respectively) in the sea have 100% of the surface one material, whereas the segmented pie wedge (see, e.g., FIG. 1A) and the layered (see, e.g., FIG. 1D) configurations have less than 100% of the surface one material.

Exemplary polymers having a softening point below 150° C. include ethylene-(meth)acrylic acid copolymers, ethylene (meth)acrylic acid ionomers, polyamides, polyvinylidene fluorides, cyclic olefins, tetrafluoroethylene/hexafluoropropylene/vinylidene fluoride (THV) copolymers, crosslinked polyethylenes, crosslinked polypropylenes, moisture cured polyurethanes (i.e., an isocyanate group crosslinks in the presence of water), epoxies, crosslinking acrylates, crosslinking silicones, or thermoplastic polyurethanes. Such polymers can be made by techniques known in the art and/or are commercially available. For example, partially neutralized ethylenemethacrylic acid co-polymer is commercially available, for example, from E. I. duPont de Nemours & Company, Wilmington, Del., under the trade designations "SURLYN 8660," SURLYN 1702,", "SURLYN 1857," and "SURLYN 9520"). Polyethylene is commercially available, for example, from Dow Chemical Company, Midland, Mich., under the trade designation "DOWLEX 2517"). Low density polyethylene is commercially available, for example, from ExxonMobil, Irving, Tex., under the trade designation "LD 200.48"). Exemplary polymers having a melting point of at least 130° C. include nylon, poly(cyclohexanedimethanol terephtalate), poly(ethylene naphthalate), poly(4-methyl-1-pentene), poly(phenylene sulfide), polyoxymethylene, or polysulfone. Such polymers can be made by techniques known in the art and/or are commercially available. For example, nylon is commercially available, for example, from BASF, North America, Florham Park, N.J., under the trade designation "ULTRAMID B27 E01"). Poly(phenylene sulfide) is commercially available, for example, from Ticona Engineering Polymers Florence, Ky., under the trade designation "FORTRON 203"). Moisture cured polyurethanes are available, for example, under the trade designation "TIVOMELT 9617/11," "TIVOMELT 9628," and "TIVOMELT 9635/12" from Tivoli, Hamburg, Germany; "PURMELT QR116" and "PURMELT QR3310-21" from Henkel Consumer Adhesives, Inc., Avon, Ohio; and "JET WELD TS-230" from 3M Company, St. Paul, Minn. Curable epoxy resins are available, for example, under the trade designations "SCOTCHCAST 5555" and "SCOTCHCAST 5400" from 3M Company. Thermally crosslinked acrylic hot-melts reported, for example, in U.S. Pat. No. 6,875,506 (Husemann, et al.). Crosslinking silicone is available, for example, under the trade designation "MASTERSIL 800" from Master Bond, Inc., Hackensack, N.J. Polyoxymethylene is available, for example, under the trade designation "CELCON" (e.g., Grade FG40U01) from Ticona Engineering Polymers.

The polymers suitable for making multi-component fibers are also suitable in some cases for use in making single component fibers. The fibers may also be crosslinked, for example, through radiation treatment or chemical means.

For example, glass fibers can be obtained through melt spinning processes. Crystalline ceramic fibers can be made, for example, via sol-gel spinning processes, followed by firing at high temperature.

In some embodiments, the aggregates may comprise one type of fiber, two or more types of fiber, or a combination of fibers and particulates. Exemplary particulates include the thermoplastic polymers mentioned above such as polyethylene and polyurethane in addition to thermoset polymers such as epoxy powders.

In some embodiments, the fiber exhibits both hydrocarbon and hydrolytic resistance as determined by the Hydrocarbon and Hydrolytic Stability Tests, respectively. In some embodiments, the fibers are non-fusing up to at least 110° C. (in some embodiments, up to at least 125° C., 150° C., or even up to at least 160° C.). Non-fusing fibers are known in the art. "Non-fusing" multi-component fibers are fibers which can autogenously bond (i.e., bond without the addition of pressure between fibers) without significant loss of the multi-component architecture. The spatial relationship between the first polymer and the second polymer is retained in non-fusing multi-component fibers. Typically multi-component fibers undergo so much flow of the first polymer during autogenous bonding that the multi-component structure is lost as the first polymer becomes concentrated at fiber junctions and the second polymer is exposed elsewhere. This is undesirable for maintaining a tacky network of fibers since the second polymer is typically non-tacky. In non-fusing fibers heat causes little or no flow of the first polymer so that the fiber tack is retained along the majority of the multicomponent fibers. To test the non-fusing nature of the fibers, a specific test is used (see "Non-Fusing Fiber Test" in the working examples section).

In some embodiments, the multi-component fibers comprise at least first and second polymers. In some embodiments, the first polymer is at least one of an ethylene(meth) acrylic acid copolymer, ethylene(meth)acrylic acid ionomer, polyamide, polyvinylidene fluoride, crosslinked polyethylene, crosslinked polypropylene, moisture cured polyurethane, epoxy, crosslinking acrylate, crosslinking silicone, or thermoplastic polyurethane, and the second polymer is at least one of a nylon, poly(cyclohexanedimethanol terephthalate), poly(ethylene naphthalate), poly(4-methyl 1-pentene), poly(phenylene sulfide), polyoxymethylene, or polysulfone.

In some embodiments, the second polymer has an elastic modulus that is higher (in some embodiments, at least 10, 25, 50, 75, 100, 500, 1000, 5000, or even at least 10,000 times higher) than the elastic modulus of the first polymer. In some embodiments, at least one of the first or second polymer is crosslinked.

In some embodiments, the first polymer has a softening temperature up to 150° C. (in some embodiments, up to 140° C., 130° C., 125° C., 120° C., 110° C., 100° C., 90° C., or even up to 80° C.), wherein the second polymer has a melting point of at least 130° C. (in some embodiments, at least 140° C., 150° C., 160° C., 170° C., 175° C., 180° C., 190° C., 200° C., 210° C., 220° C., 225° C., 230° C., 240° C., or even at least 250° C.), wherein the difference between the softening point of the first polymer and the melting point of the second polymer is at least 10° C. (in some embodiments, at least 15° C., 20° C., 25° C., 50° C., 75° C., 100° C., 125° C., 150° C., or even at least 175° C.). In some embodiments, the first polymer has an elastic modulus of less than $3 \times 10^5$ N/m$^2$ at 1 Hz at at least −60° C. (in some embodiments, up to at least −50° C., −40° C., −30° C., −25° C., −20° C., −10° C., 0° C., 10° C., 20° C., 25° C., 30° C., 40° C., 50° C., 60° C., 70° C., 75° C., or even up to 80° C.).

In some embodiments, multi-component fibers described herein further comprise at least one additional (e.g. a third, fourth, fifth, etc.) polymer each independently having a softening temperature up to 150° C. (in some embodiments, up to 140° C., 130° C., 125° C., 120° C., 110° C., 100° C., 90° C., or even up to 80° C.) and/or a melting point of at least 130° C. (in some embodiments, at least 140° C., 150° C., 160° C., 170° C., 175° C., 180° C., 190° C., 200° C., 210° C., 220° C., 225° C., 230° C., 240° C., or even at least 250° C.). In some embodiments, each additional (e.g. a third, fourth, fifth, etc.) polymer is independently at least one of a ethylene(meth)acrylic acid copolymer, ethylene(meth)acrylic acid ionomer, polyamide, polyvinylidene fluoride, crosslinked polyethylene, crosslinked polypropylene, moisture cured polyurethane, epoxy, crosslinking acrylate, crosslinking silicone, thermoplastic polyurethane, nylon, poly(cyclohexanedimethanol terephthalate), poly(ethylene naphthalate), poly(4-methyl-1-pentene), poly(phenylene sulfide), polyoxymethylene, or polysulfone.

Figure 1A:
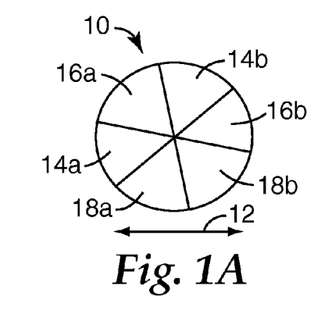
FIGS. 1A-1D are schematic cross-sections of four exemplary multi-component fibers described herein.
Figure 1B:
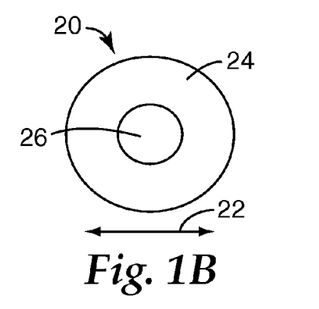
Figure 1C:
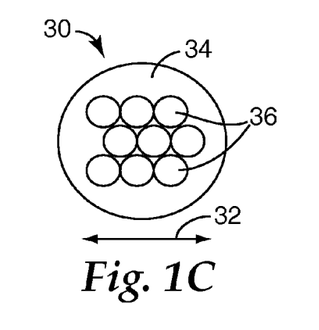
Figure 1D:
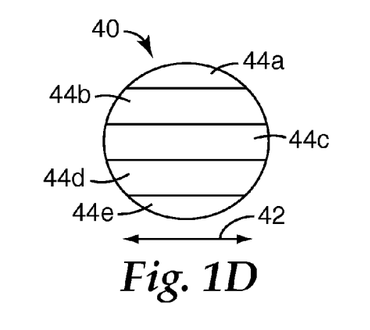
Figure 2A:
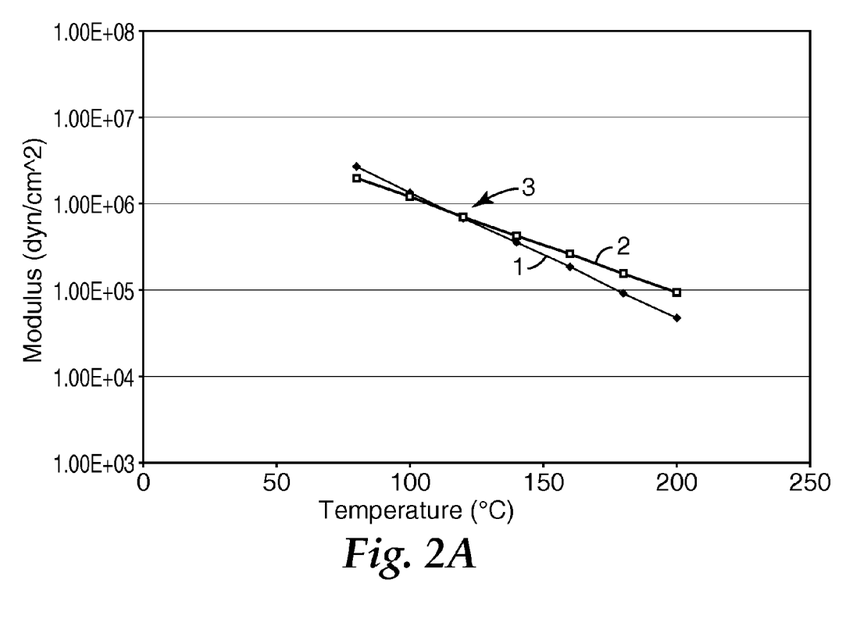
FIGS. 2A-D are elastic modulus vs. temperature plots of certain ethylene-methacrylic acid ionomers.
Figure 2B:
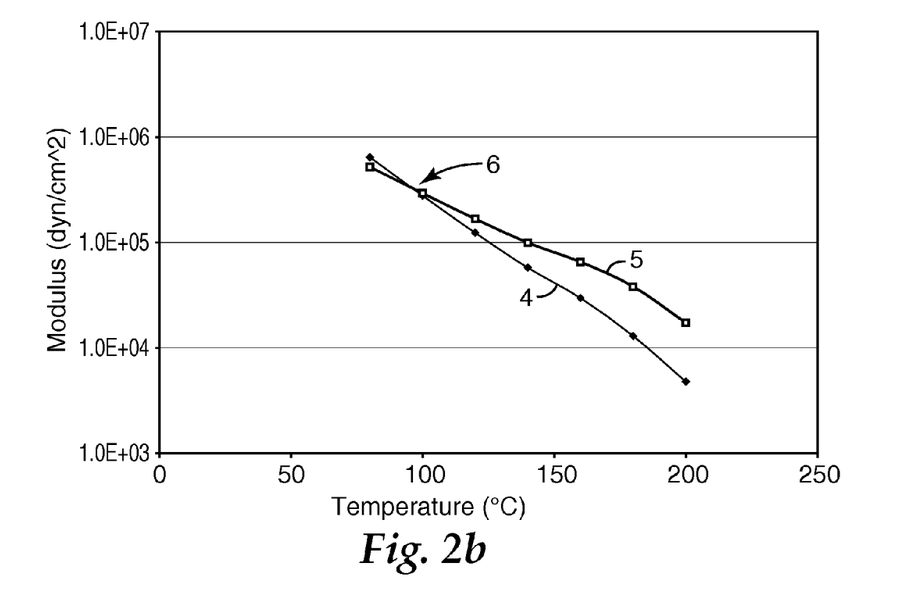
Figure 2C:
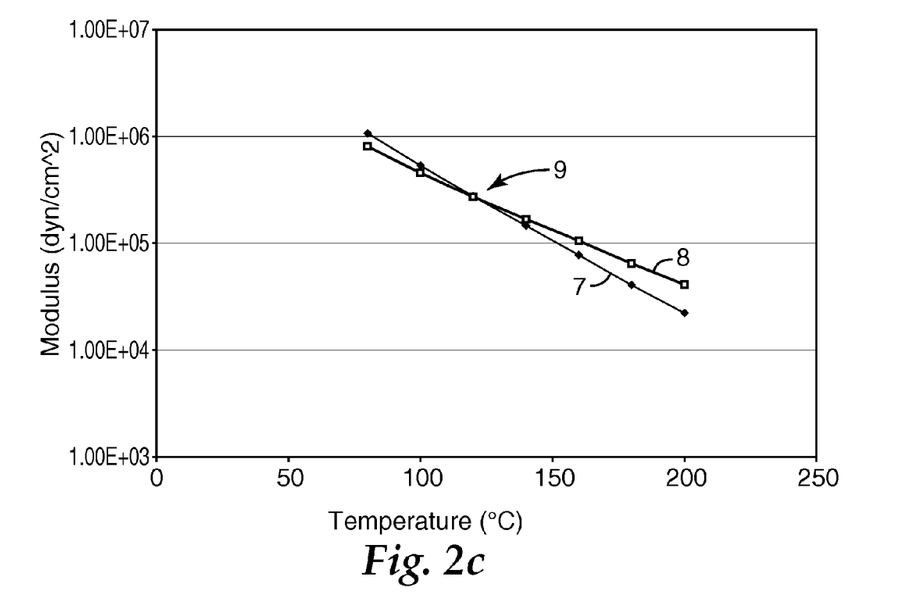
Figure 2D:
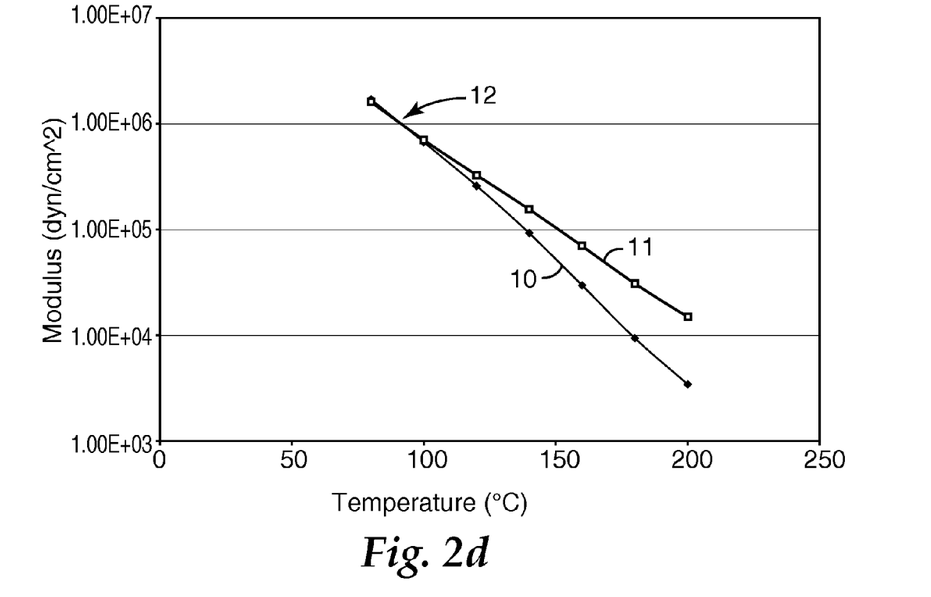

Exemplary multi-component fiber configurations are illustrated in FIGS. 1A-1D. Referring to FIG. 1A, pie-wedge fiber 10 has a circular cross-section 12, and first polymer 14a and 14b, second polymer 16a and 16b, and third and fourth polymer 18a and 18b. In FIG. 1B, multi-component fiber 20 has circular cross-section 22 and first polymer sheath 24, and second polymer core 26. FIG. 1C shows multi-component fiber 40 having core-sheath structure with a first polymer sheath 44 and plurality of second polymer cores 46. FIG. 1D shows multi-component fiber 30 having circular cross-section 32, with five layered regions 34a, 36b, 34c, 36d, 34e, which comprise alternatively at least the first and second polymers described herein.

Typically, the dimensions of the fibers in an aggregate, and components making up the fibers are generally about the same, although use of fibers with even significant differences in dimensions are also useful. In some embodiments, it may be desirable to two or more different groups of fibers (e.g., at least one different polymer, one of more additional polymers, different average lengths, or otherwise distinguishable constructions) where one group offers a certain advantage(s) in one aspect, and other group a certain advantage(s) in one aspect.

In some embodiments, the fiber aggregates further comprise binder. Exemplary binders include water soluble synthetic polymers (e.g., polyvinylpyrrolidinone and polyacrylic acid), water swellable synthetic polymers (e.g., polyacrylamide), and natural products (e.g., guar gum and xanthan gum). The material is chosen so that the dissolution of the binder occurs at the desired rate.

Other additives that may be used include glidants (i.e., flow aids) such as silicon dioxide and talc and lubricants such as fumarate or stearate salts, to aid in efficient tabletting. Disintegrants such as swellable polymers (e.g., polyacrylamide) may be used to aid in breaking up the aggregate in the target environment. Coatings such as sugar, wax and starch may be used for protection and/or brand recognition. Wetting agents or dispersants (e.g. detergents, soap, polysorbate, glycerin, and propylene glycol) may also be used to improve dispersibility.

The material is chosen so that the dissolution of the binder occurs at the desired rate. Aggregates described herein are composed mainly of short cut fibers which are formed into the aggregate and function to aid in delivery of the article in the intended application.

The amount and type of additives used may depend, for example, on the particular application and desired properties. For example, a low molecular weight polyvinyl pyrrolidinone may be used to make aggregates that disperse rapidly, whereas a high molecular weight polyvinyl pyrrolidinone may be used to make aggregates that disperse more slowly.

In some embodiments, the optional additives are dry blended with the fibers, and then processed using pressure to densify the ingredients to the desired shape and size. In some embodiments, the binder polymer can be coated on the fiber surface from solution and then subjected to densification process.

Exemplary techniques for making fiber aggregates described herein include roller compaction, chilsonating, briquetting, granulating, tabletting, and slugging.

Typically, the fiber aggregates are of a shape that provides ease of use in the application. These shapes can be spherical, elongated spheres, disk or the like. Size can be of uniform diameter or multimodal and range from 5 mm to 5 cm.

The present disclosure also describes a method of making a modified hydraulic fracturing fluid, the method comprising introducing fiber aggregates described herein into a hydraulic fracturing fluid such that the fibers separate from each other to be generally uniformly dispersed therein. In some embodiments, the hydraulic fracturing fluid further comprises proppant.

The present disclosure also describes a method of contacting a subterranean formation with a modified hydraulic fracturing fluid, the method comprising introducing fiber aggregates described herein into a hydraulic fracturing fluid such that the fibers separate from each other to be generally uniformly dispersed therein to provide a modified hydraulic fracturing fluid; and injecting the modified hydraulic fracturing fluid into a well-bore, the well-bore intersecting the subterranean formation. In some embodiments, the hydraulic fracturing fluid further comprises proppant.

The present disclosure also describes a method of making a modified hydraulic fracturing fluid, the method comprising introducing fiber aggregates described herein into a hydraulic fracturing fluid such that the fibers separate from each other to be generally uniformly dispersed therein. In some embodiments, the hydraulic fracturing fluid further comprises proppant.

The present disclosure also describes a method of contacting a subterranean formation with a modified hydraulic fracturing fluid, the method comprising introducing fiber aggregates described herein into a hydraulic fracturing fluid such that the fibers separate from each other to be generally uniformly dispersed therein to provide a modified hydraulic fracturing fluid; and injecting the modified hydraulic fracturing fluid into a well-bore, the well-bore intersecting the subterranean formation. Exemplary hydraulic fracturing fluids are well-known in the art and include water-based and/or oil-based carrier fluids.

In some embodiments, the hydraulic fracturing fluid further comprises proppant. Exemplary proppants are well-known in the art and include sand, nut shells, aluminum and aluminum alloys, wood chips, crushed coke, granulated slag, pulverized coal, crushed rock, granules of metal (e.g., steel), sintered bauxite, sintered alumina, refractories (e.g., mullite), and glass beads. Typically, the ratio of fiber aggregate described herein to proppant is, by weight, less than 99:1.

The following examples are provided to illustrate some embodiments of the invention and are not intended to limit the scope of the claims. All percentages are by weight unless otherwise noted.

Unrestrained Bulk Density Test

Unrestrained bulk density was determined as described in ASTM D1895-96 test method B (2003), except a 500 milliliter graduated cylinder (rather than a 400 milliliter cylinder) with a diameter of 50.8 mm (2 inch) and the cylinder was filled to 150 milliliters (rather than 400 milliliters), and the unrestrained bulk density is an average of 5 measurement runs.

The Aggregate Disassociation Test

This test describes a method of determining the ease of disassociation of a fiber aggregate using a magnetic stir plate (Model RCT B S1; manufactured by IKA Works, Wilmington, N.C.). In this test, a 100 ml plastic beaker was filled with 30 grams of distilled water. To this beaker was added a fiber aggregate to be tested and a 3.8 cm (1.5 inch) polytetrafluoroethylene coated magnetic spinbar (manufactured by VWR International, West Chester, Pa.). The dial on the magnetic stir plate was set to 10 (resulting in 394 revolutions per minute), and the time it took to disassociate 85% by volume of the fiber aggregate was noted and recorded. To pass the test at least 85% by volume of the fiber aggregate disassociates in the water in not greater than 5 minutes.

Melting Point Test

The melting points of the polymeric components of the invention are determined as described in ASTM D3418-03 (2003).

Softening Temperature Test

Data to determine softening points of the first polymers is illustrated in FIGS. 2A-2D. This data was generated using a stress-controlled rheometer (Model AR2000 manufactured by TA Instruments, New Castle, Del.). In the test procedure, resin particles of the polymer were placed between two 20 mm parallel plates of the rheometer and pressed to a gap of 2 mm ensuring complete coverage of the plates. A sinusoidal frequency of 1 Hz at 1% strain was then applied over a temperature range of 80-200° C. The resistance force of the molten resin to the sinusoidal strain was proportional to its modulus which was recorded by a transducer and displayed in graphical format. Using rheometric software, the modulus is mathematically split into two parts: one part that was in phase with the applied strain (elastic modulus—solid-like behavior) (for ethylene-methacrylic acid ionomers obtained from the E. I. du Pont de Nemours & Company, Wilmington, Del. under the trade designations "SURLYN 9520," "SURLYN 8660," "SURLYN 1857," and "SURLYN 1702," respectively, see lines 1, 4, 7, and 10, respectively). and another part that was out of phase with the applied strain (viscous modulus—liquid-like behavior) (for ethylene-methacrylic acid ionomers "SURLYN 9520," "SURLYN 8660," "SURLYN 1857," and "SURLYN 1702") see lines 2, 5, 8, and 11, respectively). The temperature at which the two moduli were identical (crossover temperature) was defined as a softening point, as it represents the temperature above which the resin began to behave predominantly like a liquid (see points 3, 6, 9, and 12). The softening points for the selected ethylene-methacrylic acid ionomers ("SURLYN 9520," "SURLYN 8660," "SURLYN 1857," and "SURLYN 1702") were determined to be 116° C., 96° C., 121° C., and 92° C., respectively.

Hydrolytic Stability Test 0.5 gram of fibers was placed into a 12 ml vial having 10 grams of deionized water therein. The vial was nitrogen sparged, sealed with a rubber septum and placed in an autoclave at 145° C. for 4 hours. The fibers were subjected to optical microscopic examination at 100×. They were deemed to have failed the test if either at least 50 percent by volume of the fibers or at least 50 percent by volume of one of the first or second polymer comprising the fiber dissolved and/or disintegrated.

Hydrocarbon Stability Test 0.5 gram of fibers was placed into 25 ml of kerosene (reagent grade, boiling point 175-320° C., obtained from Sigma-Aldrich, Milwaukee, Wis.), and heated to 145° C. for 4 hours under nitrogen. After 24 hours, the kerosene was cooled, and the materials were examined using optical microscopy at 100×. They were deemed to have failed the test if either at least 50 percent by volume of the fibers or at least 50 percent by volume of one of the first or second polymer comprising the fiber dissolved and/or disintegrated.

Making of the Fiber

The core material for the fibers was nylon 6 (obtained under the trade designation "ULTRAMID B27 E01" from BASF North America, Florham Park, N.J.). The sheath material was a blend of 80% by weight of an ethylene-methacrylic ionomer (obtained under the trade designation "SURLYN 1702" from the DuPont Company, Wilmington, Del.) and 20% by weight of a nylon 6 ("ULTRAMID B27 E01").

The materials were formed into sheath-core bicomponent fibers as described in Example 1 of U.S. Pat. No. 4,406,850 (Hills), except (a) the die was heated to 270° C.; (b) the extrusion die had eighteen rows of orifices where each row had 36 orifices, making a total of 648 orifices; the die had a transverse length of 264.2 mm (10.4 inches); (c) the hole diameter was 1.02 mm (0.040 inch) and the L/D ratio was 6.0; (d) the polymer flow rate was 1.0 grams/hole/minute; (e) the fibers were quenched by 15° C. air emitted at 1.42 standard cubic meters per minute (100 kilopascals pressure and 0.0° C.) on either side of the die extending downward about 64 centimeters; (f) the spinning speed was adjusted to produce a filament average diameter of 21 micrometers; and (g) the rates of polymer flow were adjusted to produce a fiber with 50% mass flow of both sheath and core.

Example 1

Figure 3:
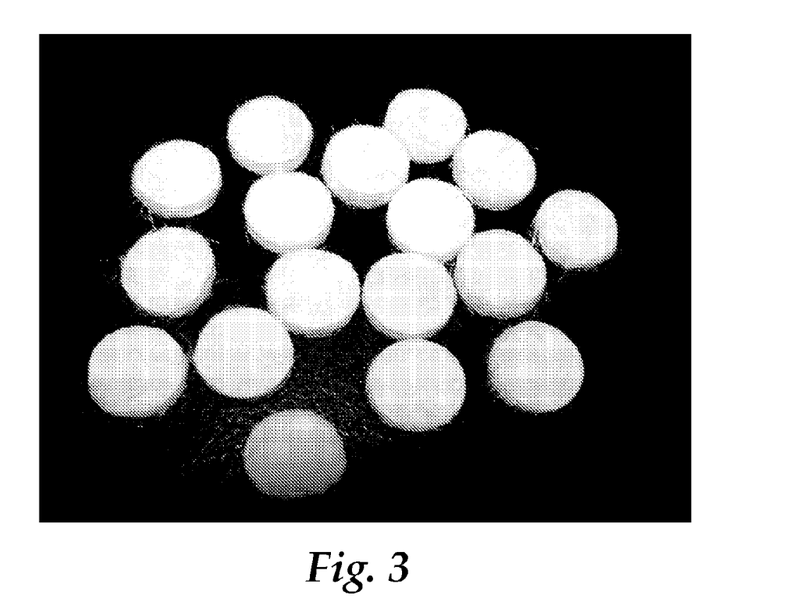
FIGS. 3-5 are digital photographs of exemplary fiber aggregates described herein.

0.25 gram of loose fibers were loaded into an evacuable 13 mm KBr pellet die (obtained from International Crystal Laboratories, Garfield, N.J.). The KBr die was loaded between two 31 cm (12 inch) plates of a press (Model 2699, manufactured by Carver Press, of Wabash, Ind.) and a pressure of 17.2 MPa (2500 psi) applied, resulting in individual aggregates as shown in FIG. 3. The longest dimension of the compressed aggregates (i.e., Example 1 aggregates) as shown in FIG. 3 was about 15 mm.

The unrestrained bulk density of these aggregates was determined using the "Unrestrained Bulk Density Test" to be 0.21 g/cm³. The Example 1 aggregates were tested for disassociation according to the Aggregate Disassociation Test. The time for 85% by volume disassociation was 51 seconds.

Example 2

A 1% by weight polyvinylpyrrolidone ("PVP") solution was made by dissolving 1.5 grams of solid PVP (obtained under the trade designation "PLASDONE K-90" from ISP Corp., Wayne, N.J.) into 150 grams deionized water. 40 grams of loose fiber was loaded into a food processor (Hamilton Beach Model 70590, manufactured by Hamilton Beach, Washington, N.C.). The dial on the food processor was turned to "blend" and 41.5 grams of the 1% PVP solution was sprayed slowly onto the fibers as they spun. The blending time was 2 minutes. More specifically, the solution was applied to the fibers by placing the outlet of a hand activated spray bottle at the throat of the bowl and directing the stream of fluid at the tumbling fibers. The solution was added over the first 30 second period of the blending process.

Figure 4:
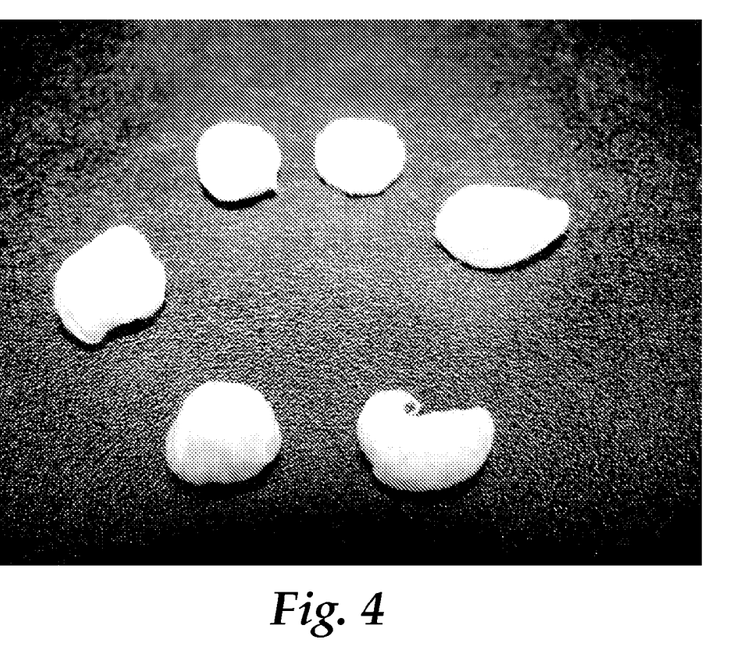

The damp fibers were emptied into a 3.8 liter (one gallon) glass jar and the jar placed on a long roll jar mill (Model 801CVM, manufactured by U.S Stoneware, East Palestine, Ohio). The dial on the roller was set to 75%, resulting in a tumbling rate of about 4.9 revolutions per minute. As the fibers tumbled, a total of 44.8 grams of the 1% PVP solution was intermittently sprayed onto the fibers. The time of tumbling was 20 minutes. More specifically, the solution was applied to the fibers by placing the outlet of a hand activated spray bottle at the opening of the glass jar with the stream of fluid directed toward the tumbling fibers. The solution was added over the first 3 minutes of the tumbling process. The resulting damp, tumbled aggregates were then placed in a conventional forced air oven set at 60° C. for 4 hours resulting in the aggregates (i.e., Example 2 aggregates) shown in FIG. 4. The longest dimensions of the Example 2 aggregates were in the range of 10-20 mm.

The unrestrained bulk density of the Example 2 aggregates was determined using the "Unrestrained Bulk Density Test" to be 0.098 g/cm³. The Example 2 aggregates were tested for disassociation according to the Aggregate Disassociation Test. The time for 85% by volume disassociation was 249 seconds.

Example 3

Figure 5:
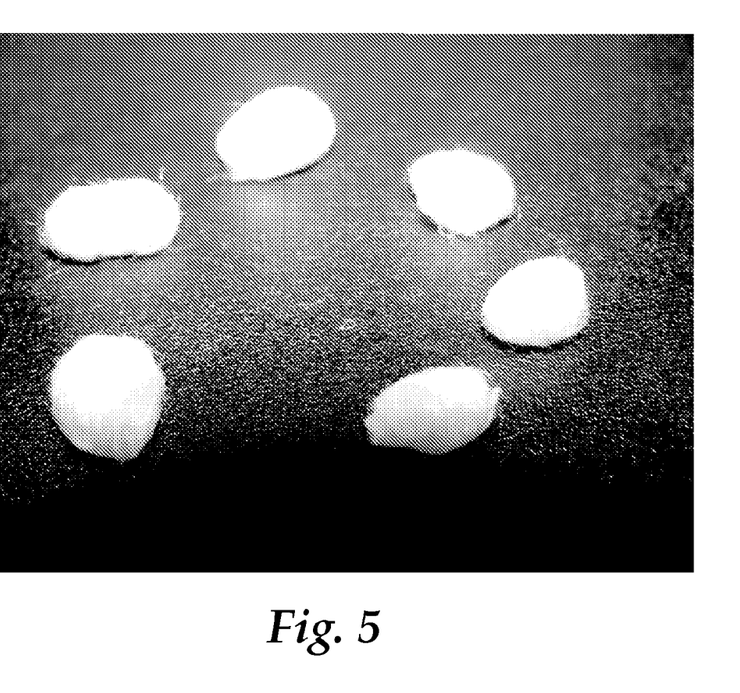

Example 3 aggregates were prepared as described in Example 2, except distilled water was used in place of the 1% PVP solution. The longest dimensions of the Example 3 aggregates as shown in FIG. 5 were in the range of 10-20 mm.

The unrestrained bulk density of the Example 3 aggregates was determined using the "Unrestrained Bulk Density Test" to be 0.098 g/cm³. The unrestrained bulk density of the loose fibers was 0.042 g/cm³. The Example 3 aggregates were tested for disassociation according to the Aggregate Disassociation Test. The time for 85% by volume disassociation was 90 seconds.

Samples of each of the Example 1-3 fibers chopped to a length of about 6 cm and tested using each of the Hydrocarbon Stability Test and the Hydrolytic Stability Test. All passed both tests.

Non-Fusing Fiber Test

The fibers were cut to 6 mm lengths separated, and formed into a flat tuft of interlocking fibers. Further, the diameter of a portion of the cut and separated fibers were measured. The diameters of 20 fibers were measured, and the median recorded.

Tufts of the fibers were heated in a conventional vented convection oven for 5 minutes at the selected test temperature. Twenty individual separate fibers were selected and fiber section diameters measured and the median recorded. The fibers were designated as "non-fusing" if there was less than 20% change in fiber diameter after the heating.

A fiber having the same sheath as that of Examples 1-3 but with a core of a different nylon from that of Examples 1-3 (obtained under the trade designation "ZYTEL RESIN 101NC010" from the E. I. duPont de Nemours & Company) was evaluated using the Non-Fusing Fiber Test, wherein the selected test temperature was 150° C. The diameter of the fiber changed least than 10% after being subjected to the test.

Similarly, a (comparative) co-PET/PET polyester binder fiber (obtained from KoSa, Salisbury, N.C. under the trade designation "KOSA T-255"; a 3 denier sheath-core binder fiber with 50% by weight core and 50% by weight sheath) was evaluated using the Non-Fusing Fiber Test, wherein the selected test temperature was 120° C. The diameter of the fiber changed from 20 micrometers before heating to 14 micrometers as a result of the heating.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A fiber aggregate comprising organic polymeric fibers, wherein at least 50 percent by volume of fibers present in the fiber aggregate are the organic polymeric fibers, wherein the organic polymeric fibers have an average length in a range from 2 to 20 millimeters, an average diameter up to 100 micrometer, and comprise at least 75 percent by solid volume of the fiber aggregate, wherein up to 80% by number of the organic polymeric fibers have an acute included angle not greater than 20°, wherein the fiber aggregate has an unrestrained bulk density of at least 0.05 g/cm³ and wherein at least 85% by solid volume of the fiber aggregate disassociates to provide dispersed fibers according to The Aggregate Disassociation Test.

2. The fiber aggregate according to claim 1, wherein organic polymeric fibers in the fiber aggregate are present in amounts selected from at least 75 percent volume, at least 90 percent volume, or at least 95 percent volume.

3. The fiber aggregate according to claim 1, wherein the fibers have an average length in a range from 2 to 10 millimeters.

4. The fiber aggregate according claim 1, wherein the fibers comprise at least 85 percent by solid volume of the fiber aggregate, at least 90 percent by solid volume of the fiber aggregate, or at least 95 percent by solid volume of the fiber aggregate.

5. The fiber aggregate according to claim 1, wherein at least 85% by solid volume of the fiber aggregate disassociates in water to provide dispersed fibers according to The Aggregate Disassociation Test.

6. The fiber aggregate according to claim 1, wherein at least 85% by solid volume of the fiber aggregate disassociates in kerosene or diesel to provide dispersed fibers according to The Aggregate Disassociation Test.

7. The fiber aggregate according to claim 1, wherein the fiber aggregate has an unrestrained bulk density greater than 0.2 g/cm³ to less than 1.2 g/cm³.

8. The fiber aggregate according to claim 1, wherein the fibers comprise multi-component organic polymeric fibers.

9. The fiber aggregate according to claim 1, further comprising a binder.

10. The fiber aggregate according to claim 1, wherein the fibers comprise multi-component fibers each comprising at least first and second polymers, wherein the first polymer has a softening temperature up to 150° C., wherein the second polymer has a melting point of at least 130° C., wherein the fibers exhibit both hydrocarbon and hydrolytic resistance as determined by the Hydrocarbon and Hydrolytic Stability Tests, respectively, wherein the first polymer has an elastic modulus of less than $3\times10^5$ N/m² at 1 Hz at −60° C., and wherein the fibers are non-fusing up to at least 110° C.

11. The fiber aggregate according to claim 10, wherein the second polymer has an elastic modulus that is higher than the elastic modulus of the first polymer.

12. The fiber aggregate according to claim 10, wherein at least one of the first or second polymer is crosslinked.

13. The fiber aggregate according to claim 1, wherein the fibers comprise multi-component fibers each comprise at least first and second polymers wherein the first polymer has a softening temperature up to 150° C., wherein the second polymer has a melting point of at least 130° C., wherein the first polymer is at least one of a ethylene(meth)acrylic acid copolymer, ethylene(meth)acrylic acid ionomer, polyamide, polyvinylidene fluoride, tetrafluoroethylene/hexafluoropropylene/vinylidenefluoride copolymer, crosslinked polyethylene, crosslinked polypropylene, moisture cured polyurethane, epoxy, crosslinked acrylate, crosslinked silicone, or thermoplastic polyurethane, wherein the second polymer is at least one of nylon, poly(cyclohexanedimethanol terephthalate), poly(ethylene naphthalate), poly(4-methyl 1-pentene), poly(phenylene sulfide), polyoxymethylene, or polysulfone, wherein at least one of the first or second polymer has an elastic modulus of less than $3\times10^5$ N/m² at 1 Hz at −60° C., and wherein the fibers are non-fusing up to at least 110° C.

14. The fiber aggregate according to claim 1, wherein at least some of the multi-component fibers further comprising a third polymer has a softening temperature up to 150° C.

15. A method of making a modified hydraulic fracturing fluid, the method comprising introducing aggregates according to claim 1 into a hydraulic fracturing fluid such that the fibers separate from each other to be generally uniformly dispersed therein.

16. The method according to claim 15, wherein the modified hydraulic fracturing fluid further comprises a proppant.

17. A method of contacting a subterranean formation with a modified hydraulic fracturing fluid, the method comprising introducing aggregates according to claim 1 into a hydraulic fracturing fluid such that the fibers separate from each other to be generally uniformly dispersed therein to provide a modified hydraulic fracturing fluid; and injecting the modified hydraulic fracturing fluid into a well-bore, the well-bore intersecting the subterranean formation.

18. The method according to claim 17, wherein the modified hydraulic fracturing fluid further comprises a proppant.

* * * * *

UNITED STATES PATENT AND TRADEMARK OFFICE
CERTIFICATE OF CORRECTION

PATENT NO. : 8,353,344 B2  
APPLICATION NO. : 12/747985  
DATED : January 15, 2013  
INVENTOR(S) : James G Carlson Page 1 of 1

It is certified that error appears in the above-identified patent and that said Letters Patent is hereby corrected as shown below:

Title Page, Item [57], Column 2, Abstract
Line 6, Delete "g/cm$_3$," and insert -- g/cm$^3$, --, therefor.

In the Specifications
Column 1
Line 65, Delete "than) 10°," and insert -- than 10°), --, therefor.

Column 5
Line 20, Delete "at at" and insert -- at --, therefor.

Column 6
Line 1, Delete "polyvinylpyrrolidinone" and insert -- polyvinyl pyrrolidnione --, therefor.

In the Claims
Column 11
Line 13, In Claim 10, delete "at" and insert -- at least --, therefor.

Column 12
Line 7, In Claim 13, delete "at" and insert -- at least --, therefor.

Signed and Sealed this  
Fourteenth Day of May, 2013

Teresa Stanek Rea  
*Acting Director of the United States Patent and Trademark Office*